United States Patent [19]

Carson

[11] Patent Number: 5,089,072
[45] Date of Patent: Feb. 18, 1992

[54] METHOD OF PROTECTING A CATALYTIC CONVERTER BLOCK WITH A FIBROUS MATERIAL PACKING

[75] Inventor: John E. Carson, Clwyd, United Kingdom

[73] Assignee: Fibre Techniques Limited, United Kingdom

[21] Appl. No.: 208,353

[22] Filed: Jun. 17, 1988

[30] Foreign Application Priority Data

Jun. 18, 1987 [GB] United Kingdom ............... 8714285
Feb. 25, 1988 [GB] United Kingdom ............... 8804403

[51] Int. Cl.$^5$ ............................................. B65C 3/00
[52] U.S. Cl. ................................. 156/212; 156/213; 156/214; 156/215; 156/187
[58] Field of Search .......................... 156/212–215, 156/218, 443, 187; 181/231, 243, 252, 256; 60/299; 55/278

[56] References Cited

U.S. PATENT DOCUMENTS

| | | | |
|---|---|---|---|
| 3,233,699 | 2/1966 | Plummer | 181/252 X |
| 3,522,863 | 8/1970 | Ignoffo | 181/212 |
| 4,462,444 | 7/1984 | Larson | 215/100.5 X |
| 4,693,338 | 9/1987 | Clerc | 181/256 X |
| 4,765,856 | 8/1988 | Doubt | 156/215 X |
| 4,874,648 | 10/1989 | Hill | 156/212 X |

FOREIGN PATENT DOCUMENTS

| | | |
|---|---|---|
| 2633325 | 1/1986 | Fed. Rep. of Germany . |
| 3521467 | 12/1986 | Fed. Rep. of Germany . |
| 563548 | 5/1975 | Switzerland . |
| 305905 | 2/1929 | United Kingdom . |
| 604794 | 6/1948 | United Kingdom . |
| 753351 | 7/1956 | United Kingdom . |
| 1446591 | 8/1976 | United Kingdom . |
| 1462091 | 1/1977 | United Kingdom . |
| 1589613 | 5/1981 | United Kingdom . |
| 2073042 | 10/1981 | United Kingdom . |
| 2092718 | 8/1982 | United Kingdom . |
| 2150028 | 6/1985 | United Kingdom . |
| 2171180 | 8/1986 | United Kingdom . |
| 2180756 | 4/1987 | United Kingdom . |
| 8400943 | 3/1984 | World Int. Prop. O. . |

Primary Examiner—David Simmons
Assistant Examiner—Chester T. Barry
Attorney, Agent, or Firm—Maksymonko & Slater

[57] ABSTRACT

A catalytic converter block is wrapped in a loose laminate of plastics material and a mat fibrous material, the plastics material being secured to the block at one end and continuing beyond the mat of fibrous material to cover same completely. The plastics material is secured under tension so as to compress the fibrous material to facilitate fitting in a casing for the converter block.

12 Claims, 2 Drawing Sheets

METHOD OF PROTECTING A CATALYTIC CONVERTER BLOCK WITH A FIBROUS MATERIAL PACKING

This invention concerns fibrous material packaging, such as of ceramic and mineral fibres, a method of making same and their use.

Ceramic and mineral fibrous materials are used, for example, in catalytic converters for motor vehicles. Such catalytic converters are for the treatment of exhaust gases to render them substantially harmless before emission to atmosphere. Treatment is by passing the exhaust gases through a chamber enclosing a porous ceramic block whose pores are coated with a suitable catalyst.

The fibrous material surrounds the ceramic block in order to insulate it from colder temperatures outside the converter, to provide sound proofing and to cushion the ceramic block against expansion and contraction of the chamber.

A commonly used fibrous material is that sold under the trade name SAFFIL which is 95% alumina and provided as a low density mat. In the manufacture of some catalytic converters for motor vehicles a sheet of the fibrous material is laid on one half of the chamber, the ceramic block placed in that half of the chamber, the sheet folded over the block and the other half of the chamber placed on top. The two chamber halves are then pressed together hydraulically so that the edges thereof can be welded together.

The ends of the fibrous material sheet are supposed to meet when folded over the ceramic block. However, as the material is being compressed and folded over more or less at the same time, the ends of the sheet do not always meet. This can leave an area of the ceramic block not afforded the above-mentioned protection.

Furthermore, due to the fibrous nature of the material, a certain amount of disintegration of the sheet occurs during the manufacturing of catalytic converters.

A certain amount of compression of the fibrous material is, however, desirable so that there is a reasonably secure fit for the ceramic block in the chamber, i.e. so that it will not shake about.

Proposals have been made in our U.K. Patent Specification No. 2171180A for wrapping and sealing the fibrous material under vacuum or at least reduced pressure in a substantially air impervious material, such a plastics envelope or pouch. The resultant package was easier to handle and being compressed easier to wrap around the ceramic block.

However, as very little oxygen passes through a catalytic converter during use, the plastics material was not burnt off but formed discrete globules that caused hard areas within the fibrous material. These hard areas impaired the action of the fibrous material.

An object of this invention is to provide a way of installing fibrous material so that the above mentioned problems are overcome or at least reduced.

According to the invention fibrous material in mat form is wrapped around a part to be covered, such as a catalytic converter ceramic block, in a loose laminate with a layer of plastics material, the plastics material continuing beyond the fibrous material to cover same completely.

In a preferred embodiment, the fibrous material is laid on a longer length of plastics material and the two layers wrapped around the part to be covered the plastics material continuing to be wrapped around the part after the fibrous material is all wrapped so as to cover the fibrous material completely.

The plastics layer is preferably firstly adhered to the part to be wrapped. Any suitable adhesive or adhesive means may be used for this but double-sided adhesive tape has been found to be quite suitable for that purpose. The plastics layer can then be wrapped under tension so as to compress the fibrous material. Further adhesive means, such as double-sided adhesive tape, may then be provided for the other end of the plastics layer in order to maintain said tension and hence compression of the fibrous material when wrapping has been completed.

The plastics material for use in the invention need not be very thick but preferably has sufficient tensile strength for compression of the fibrous material without significant stretching. It is envisaged that plastics layers of say 10–20 $\mu$ thick may be used in the invention. Within this range of thicknesses, it is believed that burning off of the plastics material in say a catalytic converter may be possible and that, even if complete burning off of the plastics material is not possible, the amount of plastics material remaining is so small as to cause little or no unwanted contamination of the fibrous material.

Another important feature of the plastics material at least for use in wrapping catalytic converter blocks is that upon decomposing no harmful substances are released i.e. that could contaminate the ceramic block of the converter.

Particularly suitable plastics material for use in the present invention will be those based on carbon and hydrogen only and possibly also on oxygen. Polypropylene has been found to be especially suitable as the plastics material.

Referring to the wrapping of catalylic converter blocks in accordance with the invention and particularly to oval section converter blocks to be encased in half shells, to facilitate fitting a wrapped converter block it is advantageous to have the fibrous material compressed most at the sides of the converter rather than at the top or bottom. The wrapping proposed by the present invention actually provides the desired compression due to the shape of the converter block, i.e. the tension applied to the plastics layer has a greater inwards component on the more sharply curved sides of the converter block rather than on the shallower curves at the top and bottom of the converter block.

A problem noted with respect to particularly oval section catalytic converters is the variation in heat expansion rates over the half shells or casing of the converter. The rate of heat expansion of the casing in its flatter regions is, in fact, greater than that of its more curved ends. Thus, in use, the amount of fibrous material between the converter block and the flatter regions of the casing, will not necessarily be sufficient to provide the desired protection of the converter block or exhaust gas leakage.

It may, therefore, be advantageous to provide greater thickness of fibrous material over flatter regions of a converter block than elsewhere. That may be achieved by providing separate pads of fibrous material on the flatter regions of the converter block either above or below a wrapping of the invention.

Alternatively separate wrappings according to the invention may be used that overlap over the flatter regions of the converter block only.

Another alternative may be to provide a pad of fibrous material on one of the flatter regions of the block and then provide a wrapping according to the invention that overlaps over the opposite flatter region to that which is provided with the pad of fibrous material.

The extra thickness of fibrous material over the flatter regions of the converter block can, thus, compensate for the greater expansion of the casing in those regions by expanding to fill the resultant space, as the fibrous material is usually fitted initially in a compressed state.

The invention also comprehends a catalytic converter block wrapped in accordance with the invention as well as a catalytic converter comprising a wrapped catalytic converter block.

Any number of turns of plastics and fibrous material may be used to complete a wrapping. In catalytic converters, the amount of fibrous material used is usually determined by weight rather than thickness so that as many turns as necessary to wrap the desired weight of material around a converter block will be used provided, of course, that at least one layer of fibrous material completely surrounds the block.

The invention will now be further described, by way of example only, with reference to the accompanying drawings in which.

Figure 1:
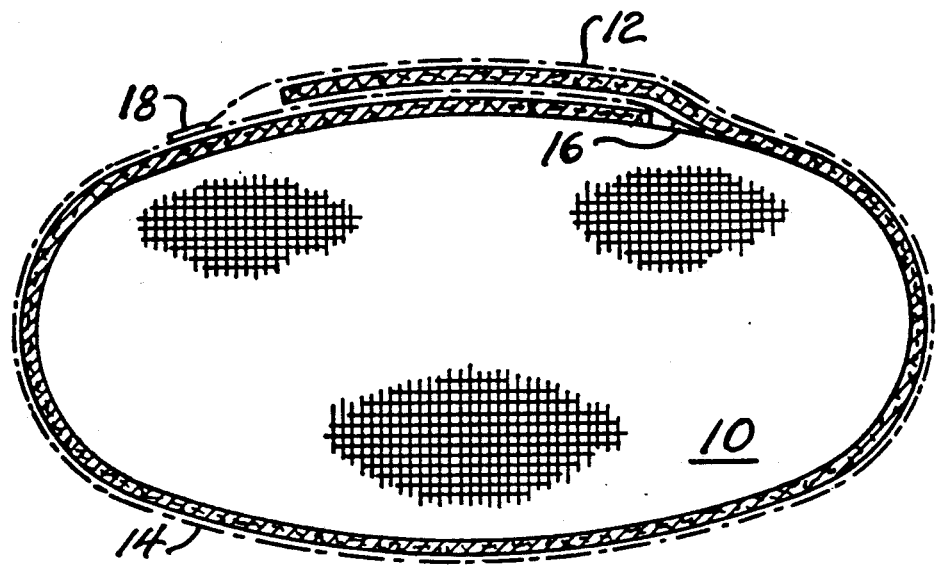
FIG. 1 shows in section a catalytic converter wrapped according to a first embodiment.

Referring to FIG. 1 of the accompanying drawings, a catalytic converter block 10, of the type usually housed in metal half shells welded together is wrapped in a loose laminate of a layer of plastics material 12, such as polypropylene of 10–20 μ thickness, and a layer of SAFFIL fibre 14. The plastics material layer 12 is fixed to the block 10 by means of a strip of double-sided adhesive tape 16. The plastics material layer is longer than the fibrous material layer 14 so that when the laminate is wound around the block, the plastics layer continues beyond the fibrous material to completely cover it. The end of the plastics layer is then fixed down with another strip of double-sided adhesive tape 18.

The plastics layer is kept under tension during wrapping, so that the fibrous material layer is compressed. Compression of the fibrous material will be greater at the sides of the block 10 rather than at the top or bottom and this will facilitate fitting the wrapped block between catalytic converter half shells.

Figure 2:
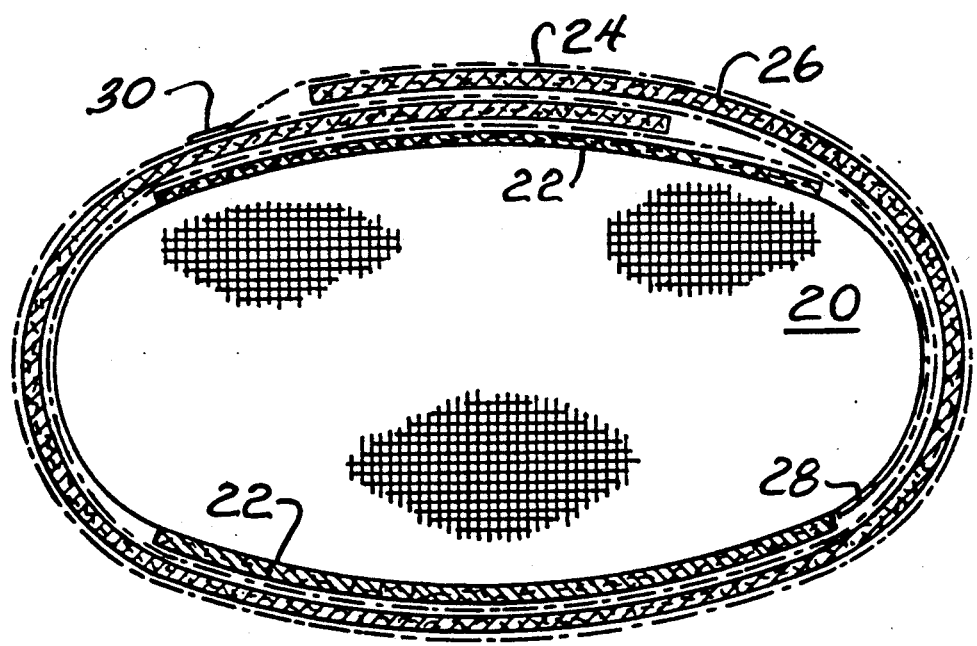
FIG. 2 shows in section a catalytic converter wrapped according to a second embodiment.

Turning to FIG. 2 of the accompanying drawings, an oval section catalytic converter block 20, of the type usually housed in metal half shells welded together, has on both of its sides of shallowest curvature a pad of Saffil fibre 22 and an overall wrapping of a loose laminate of a layer of plastics material 24 such as polypropylene of 10 to 20 μ thickness, and a layer of Saffil fibre 26 which actually overlaps at its ends. The plastics material 24 is longer than the fibre 26 and is secured under tension at each end by means of double-sided adhesive as at 28 and 30.

The pads 22 provide extra thickness of Saffil fibre on the "flatter" parts of the converter block to compensate for greater and outward distortion of the converter half shells in those regions.

Figure 3:
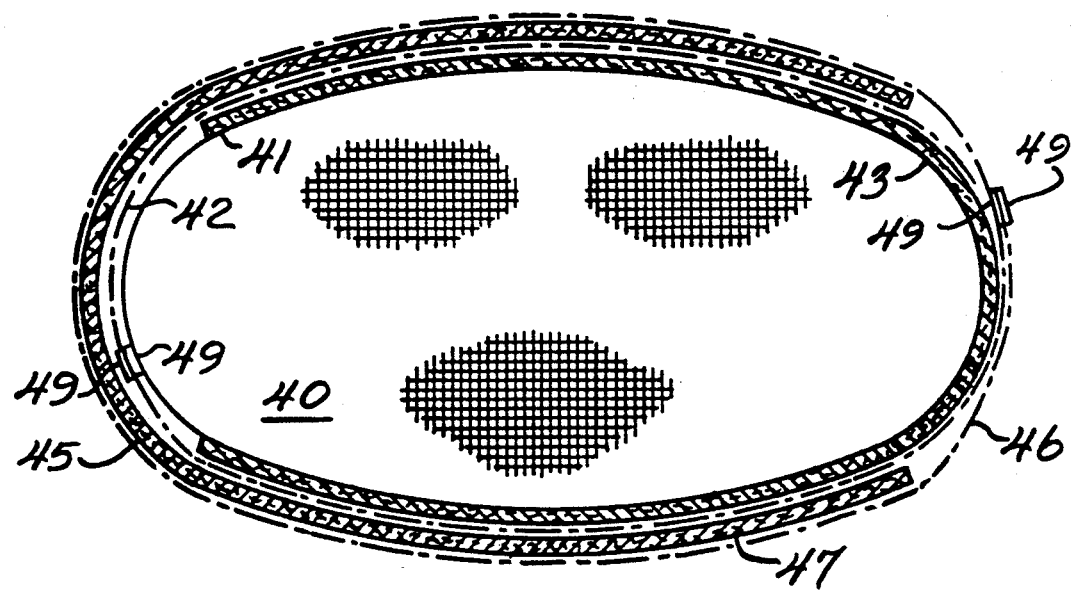
FIG. 3 shows in section a catalytic converter wrapped according to a third embodiment.

The embodiment of FIG. 3 addresses the same problem as that of FIG. 2, namely compensating for distortion of the converter half shells by providing additional thickness of Saffil fibre over the "flatter" regions of a catalytic converter block 40. In this embodiment a first partial wrapping of a loose laminate 41 of a plastics sheet 42 and Saffil fibre mat 43 is laid on the block 40 that extends over both flatter sides of the block and one intermediate end of the block and then a second loose laminate 45 of plastics sheet 46 and Saffil fibre 47 is laid on top of that again covering the flatter sides of the block but covering the opposite intermediate end of the block to the first wrap. Both wrappings 41 and 45 have the plastics sheet longer than the fibrous material and the ends of the plastics sheet are secured under tension by means of double sided adhesive tape 49.

Figure 4:
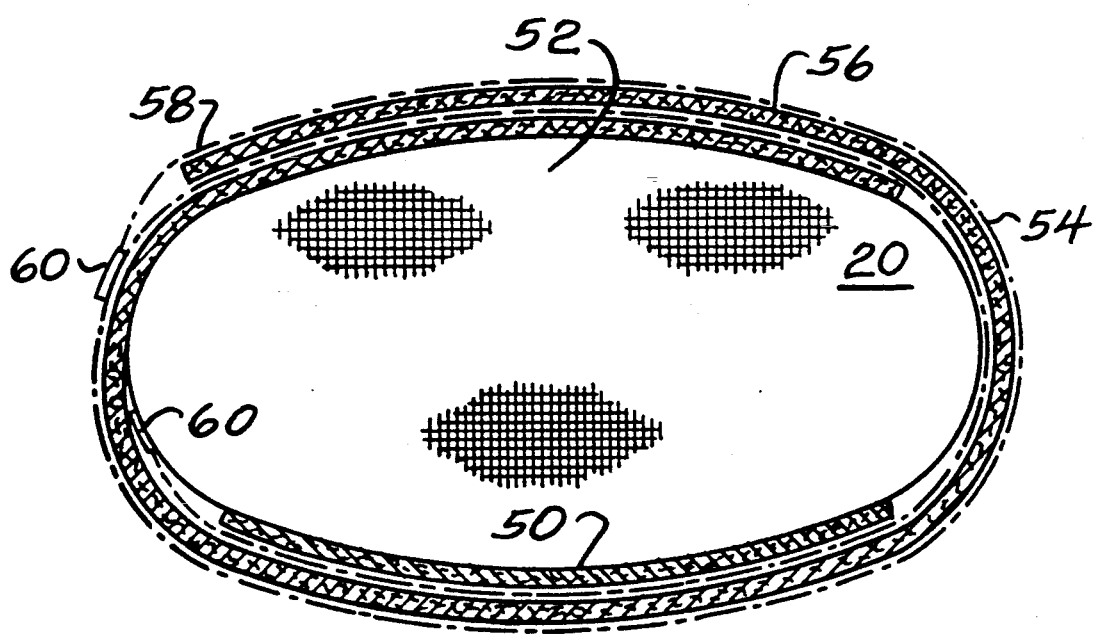
FIG. 4 shows in section a catalytic converter wrapped according to a fourth embodiment.

Finally, in FIG. 4 of the accompanying drawings, which again is aimed at the problem of compensating for greater expansion of the converter half shells over the flatter regions of the converter, a pad 50 of Saffil fibre is laid on one of the flatter surfaces of a catalytic converter block 52. Then a loose laminate 54 of Saffil fibre 56 and plastics sheet 58 is wrapped around the block 52 starting from the opposite side of the block to that on which the pad 50 has been placed. The wrapping is continued around the block to cover the pad 50 and to overlap itself so that two thicknesses of fibrous material are provided on the opposing flatter region of the converter block.

The laminate 54 has the plastics sheet 58 longer than the fibrous material at each end and the plastics sheet is secured under tension by means of double sided adhesive tape 60 at each end.

Clearly there will be other ways than illustrated above of achieving greater thicknesses of fibrous material over the flatter regions of converter blocks and these are considered to be within the spirit and scope of the present invention.

Furthermore, whilst the invention has been exemplified with reference to catalytic converters, it will be appreciated that the present invention will have wider application.

I claim:

1. A method for protecting and insulating a catalytic converter block prior to placement in a protective metallic shell, comprising the steps of wrapping a catalytic converter block in a mat of fibrous material and an associated covering layer of combustible plastics material, said mat overlapping itself and said covering layer extending beyond the associated mat so that the covering layer makes overlapping contact with itself and completely covers the mat, said wrapping step including the step of applying tension to the covering layer being wrapped while the fibrous material mat is being wrapped on the converter block whereby a compressed layer of fibrous material is positioned around the converter block thereby permitting the protected and insulated block to thereafter be positioned within a metallic shell.

2. A method as claimed in claim 1, wherein the plastics material is based on carbon and hydrogen only.

3. A method as claimed in claim 2, wherein the plastics materiala is polypropylene.

4. A method as claimed in claim 1, comprising providing greater thickness of fibrous material over flatter regions of said part than elsewhere.

5. A method as claimed in claim 4 comprising providing separate pads of fibrous material on the flatter regions of the part either above or below a main wrapping.

6. A method as claimed in claim 4, comprising providing separate wrappings that overlap over the flatter regions of the part only.

7. A method as claimed in claim 4 comprising providing a pad of fibrous material on one of the flatter regions of the part and then providing a wrapping that overlaps over an opposite flatter region to that which is provided with the pad of fibrous material.

8. A method as claimed in claim 1 wherein said mat is in two parts and is wrapped to provide a double thickness of fibrous material over flatter portions of said catalytic converter block.

9. A method as claimed in claim 1 comprising the step of wrapping a further mat of fibrous material about said catalytic converter block either over or under said first provided mat so that multiple thicknesses of fibrous material are provided over flatter portions of said catalytic converter block.

10. The method of protecting and insulating a catalytic converter block of claim 1 including the step of placing the wrapped converter block in a protective metallic shell.

11. The method of protecting and insulating a catalytic block of claim 10 wherein the protective metallic shell is comprised of two half-shells whereby the wrapped catalytic converter block may be positioned therein without axial movement of the wrapped block with respect to the metallic shell thereby avoiding bunching or tearing of the plastic and fibrous materials.

12. A method of protecting and insulating a catalytic converter block prior to placement in a protective metallic shell including the steps of positioning at least one wrapping around said block, each wrapping comprising a mat of fibrous material and an associated covering layer of combustible plastics material; placing at least one mat in overlapping orientation whereby said one mat overlaps itself or another mat; placing tension on the plastics material during wrapping; extending the plastics material beyond its associated mat whereby the plastics material makes contact with a plastics material of one of the wrappings thereby completely covering the fibrous material with the plastics material.

* * * * *